J. ROACH.
STOCK WATERING DEVICE.
APPLICATION FILED APR. 4, 1908.
929,883.
Patented Aug. 3, 1909.
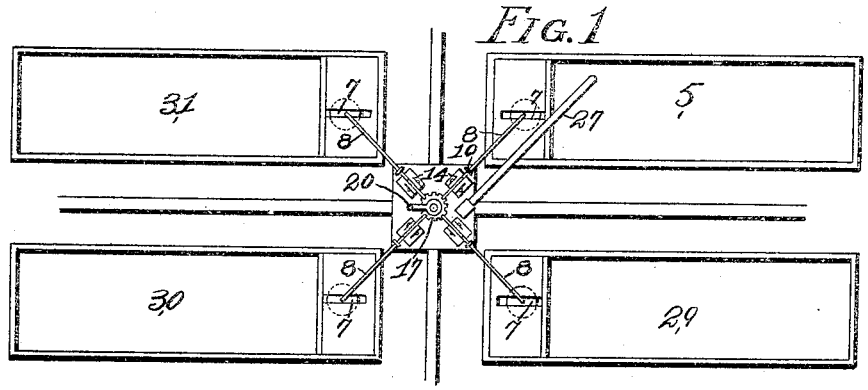
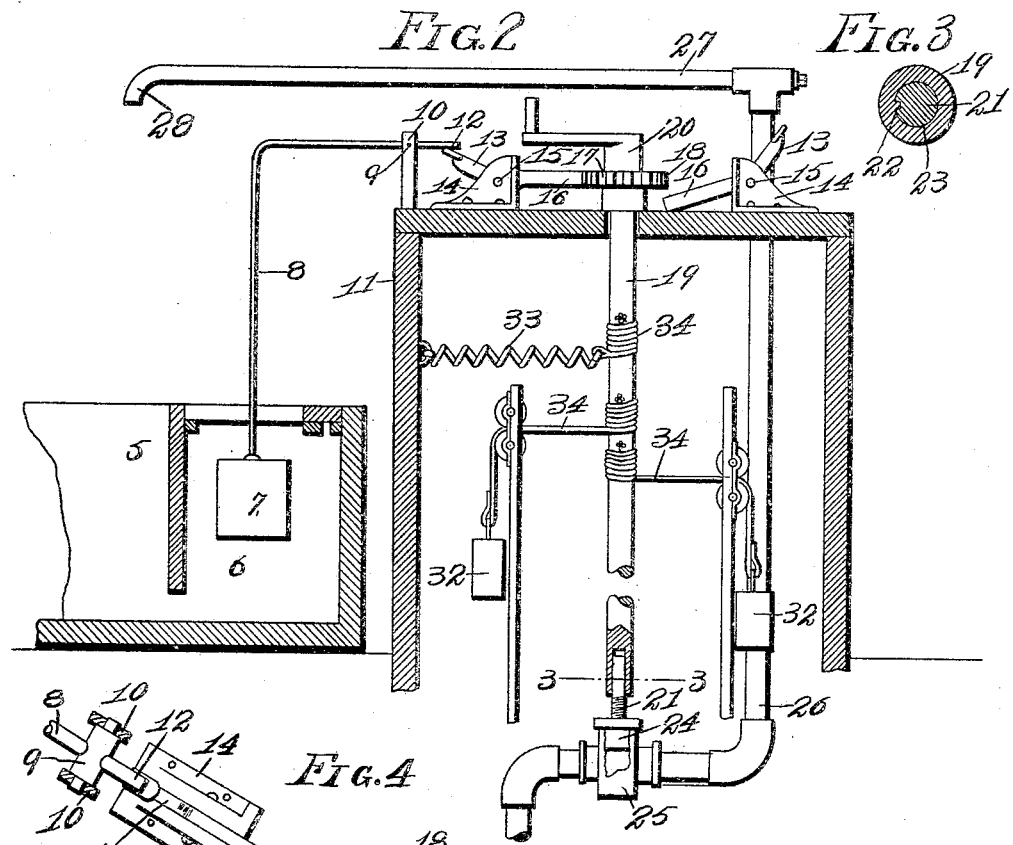
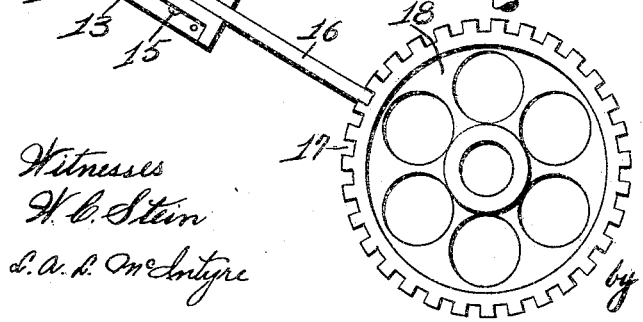
Witnesses
W. C. Stein
L. A. L. McIntyre
Inventor
John Roach
by Hopkins & Eicks Attys.

UNITED STATES PATENT OFFICE.

JOHN ROACH, OF EAST ST. LOUIS, ILLINOIS.

STOCK-WATERING DEVICE.

No. 929,883.      Specification of Letters Patent.      Patented Aug. 3, 1909.

Application filed April 4, 1908. Serial No. 425,268.

*To all whom it may concern:*

Be it known that I, JOHN ROACH, a citizen of the United States, and resident of East St. Louis, Illinois, have invented certain new and useful Improvements in Stock-Watering Devices, of which the following is a specification.

My invention relates to improvements in stock watering devices, and has for its object to provide a mechanism whereby the flow of water to a watering trough is discontinued when the water contained in the trough has reached a predetermined level.

In the drawings—Figure 1 is a top plan view of a device embodying my invention. Fig. 2 is an enlarged vertical view in section of the regulating device employed in my invention. Fig. 3 is a transverse view in cross-section of the valve controlling rod employed in my invention, taken on the line 3—3 of Fig. 2. Fig. 4 is an enlarged plan view of the locking wheel employed in my invention and its connections.

As shown in the drawings, the watering trough 5 is provided with a compartment 6 containing the float 7; this float being mounted upon the angle-bar 8 pivotally mounted as indicated by the numeral 9 in the standard 10, which standard 10 is mounted upon the top of the housing 11. The inner end of the angle-bar 8, indicated by the numeral 12, engages with the outer end of the dog 13, which dog 13 is mounted in the bracket 14 by means of the pivot 15. The inner end of the dog 13, indicated by the numerals 16, is preferably rectangular in section as illustrated in the drawing, and its end engages with the depression 17 in the cogwheel 18, the cogwheel being in turn mounted upon the valve rod 19. The valve rod 19 is provided at its upper extremity with the crank 20, and at its lower end receives the valve screw 21, the valve screw being splined, as indicated by the numeral 22 in Fig. 3, within the bore 23 at the lower end of the valve rod 19. The valve screw 21 carries at its lower end the plunger valve 24 seated in the housing 25 to intercept the flow of the water supply through the pipe 26 to the revoluble discharge pipe 27. The discharge pipe 27 is made revoluble in order that its terminal-nozzle 28 may be swung in rotation to any desired number of troughs within its radius; these troughs being indicated in series in
Fig. 1, where they are indicated by the numerals 5, 29, 30 and 31.

The mode of operation of my device is as follows: The valve 24 being open and the parts in the relative position shown in Fig. 2,
water is discharged from the nozzle 28 into the trough 5 and the connecting chamber 6, until the desired and predetermined water level is attained; whereupon the upward movement of the float 7, through the angle-bar 8 depresses the outer end of the dog 13, thus raising the inner end, 16, of the dog 13 and throwing its extremity out of engagement with the cogwheel 18. The valve rod 19 is provided with weights 32 and a spring 33, mounted upon said valve rod in the manner illustrated in Fig. 2 and connected therewith by the cords 34. The cogwheel being released by the operation just described, the valve rod 19 is caused to revolve by the weights 32 and spring 33, seating the valve 24 in place within its housing 25, thus interrupting the flow of water through the pipes 26 and 27. The discharge pipe 27 is then revolved to discharge into one of the other troughs in the series, 29, 30 or 31, the valve 24 is released by means of the crank 20, and the dog 13 belonging to the trough about to be filled is engaged with one of the openings 17 in the cogwheel 18, and is again released therefrom by the same operation above described, when a sufficient amount of water has been discharged through the discharge pipe 27.

Having fully described my invention, what I claim as new and desire to have secured to me by the grant of Letters Patent, is:

In a stock watering device the combination of a plurality of watering troughs arranged about a common center; a water supply pipe; a rotatable terminal-nozzle mounted on the upper extremity of said supply pipe and a float loosely mounted in each of said troughs; lever arms carrying said floats; pivotally mounted dogs registering with each of said lever arms; a plunger valve situated in the supply pipe; a valve rod adapted to control said valve; a cog-wheel mounted on said valve rod and adapted to be engaged successively with said dogs to close said valve when the water has reached a predetermined level in the trough being supplied by the terminal-nozzle, substantially as described.

In testimony whereof, I have signed my name to this specification, in presence of two subscribing witnesses.

JOHN ROACH.

Witnesses:
ALFRED A. EICKS,
WALTER C. STEIN.